Sept. 5, 1939.    E. A. HAUSER    2,171,552
PROCESS FOR MAKING RUBBER ARTICLES
Filed Dec. 29, 1936
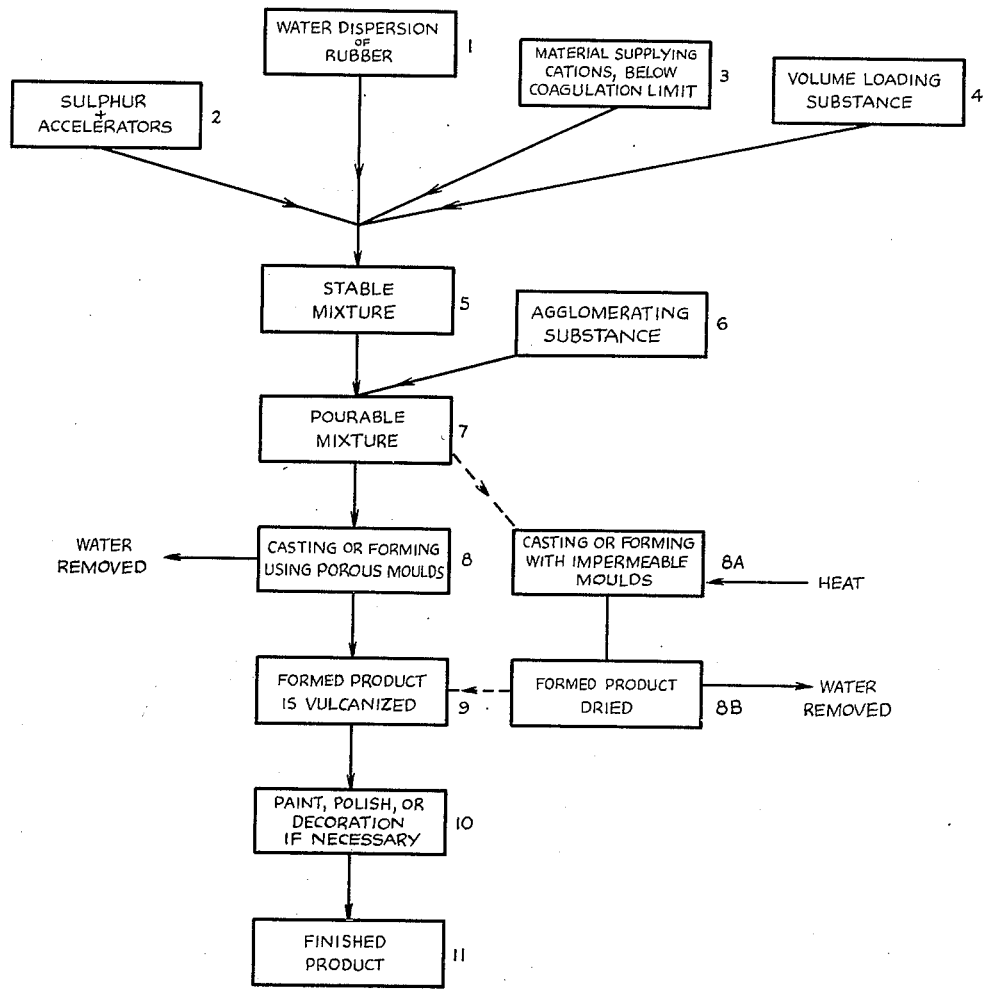
Inventor
Ernst A. Hauser
By Theodore C. Browne
Attorney Patented Sept. 5, 1939

2,171,552

UNITED STATES PATENT OFFICE 2,171,552

PROCESS FOR MAKING RUBBER ARTICLES

Ernst Alfred Hauser, Cambridge, Mass., assignor to the firm "Semperit" Oesterreichisch-Amerikanische Gummiwerke Aktiengesellschaft, Vienna, Austria Application December 29, 1936, Serial No. 118,074

7 Claims. (Cl. 18—58)

This is a continuation in part of my application for patent, Serial No. 718,324, filed March 31, 1934.

This invention relates to the casting of rubber articles directly from latex and has for its objects to produce rubber articles having material wall thickness in a quick and expeditious manner; to permit volume loadings of a hitherto unattainable degree; to produce cast articles with such low water content that they may be handled easily; and, to prevent shrinkage and distortion of the article upon subsequent drying and cure. Incidental objects are to produce articles at much lower cost than formerly has been attainable and to utilize much less expensive manufacturing equipment. These and other objects will become apparent from the specification and from the flow sheet forming the attached drawing where the process steps are set forth.

Prior methods of manufacturing formed shapes directly from latex have ordinarily produced, as an intermediate product, formed shapes which must be removed from the mold or form while they still contain a substantial quantity of water. They then must be maintained in shape, dried and cured. It is characteristic of some of the processes that the entire quantity of water originally associated with the latex is entrapped within the gel or coagulum which forms the intermediate product, and, since this water must be removed, a very considerable volume change takes place upon drying and curing. Unless special and expensive precautions are taken, such severe shrinkage results that the article loses its shape and utility.

Further, in utilizing water extraction processes, it has been found extremely difficult to build up upon the wall of the mold or upon the surface of the former any considerable wall thickness of rubber, for as the thickness of the rubber film formed against the surface of the mold or former increases, the transfer of water from the body of latex into the mold slows down to such an extent that only relatively thin articles may be commercially produced.

In my prior application, to which I have referred, I disclosed a process for casting rubber dispersions in such a manner that very thick and quite dry articles were quickly produced. Therein, I recommended that gypsum, Keene cement, flooring plaster, cement and like mortar producers be added to latex. Subsequent to this addition, any of the known agglomerating agents for latex, for example, calcium formate, aluminum sulfate, etc., were to be added and the mixture cast, preferably in porous molds.

As an example, I showed:

| | Parts |
|---|---|
| Concentrated latex (68–70% solids) | 130 |
| Sulphur | 2 |
| Zinc oxide | 5 |
| Gypsum ("Estrich Gips") | 170 |
| Chalk | 80 |
| Zinc-ethyl-phenyl-dithiocarbamate | 0.75 |
| Water | 75 |

The above was to be worked into a smooth paste or dough. To this mixture (which is stable) 75 parts of a 6.5% solution of calcium formate was added and the resultant mixture poured into a porous mold. In a few minutes a thick, formed shape of rubber was removed which, according to a water determination made before drying, contained only 8 to 12% of water. Because of the small amount of water present, the articles could be immediately vulcanized without support and without danger of blowing or shrinkage.

Further work upon the process now indicates, as the most probable explanation, that this unusual result is not due primarily to the physical characteristics possessed by the gypsum or cement, but to the fact that they are essentially insoluble substances and release in the solution such a small supply of multi-valent ions that the critical point, at which coagulation of the latex is brought about is not reached. In this sub-critical concentration, however, they induce certain changes in the latex, the full import of which has not, previous to my invention, been recognized.

A certain confirmation for the hypothesis set forth above is found in the fact that a rather wide range of multi-valent substances, if added in low concentration, induce the same change in the latex and allow the process to proceed in exactly the same manner as when the original substances are used.

The peculiar first stage imparted to the latex may be brought about not only by the calcic and aluminous substances mentioned, but by minor concentrations of ions which are generally known to flocculate latex and, generally speaking, any multi-valent cation is effective. Examples of ions which bring about the change are the bi-valent ions, such as calcium, magnesium, barium and zinc; and, tri-valent ions, such as aluminum and iron. It is essential that these be added to the latex in such low mass concentration that coagulation is not brought about. When such ions have been added in an amount below the critical limit, the latex is, to all superficial appearance, unaffected—it still remains a dispersed system; it still exhibits the colloidal phenomenon of Brownian movement; it still has particles which are sub-microscopic in size; but, there is good reason to believe that the sub-microscopic particles of rubber have somehow been drawn together and that the resulting clumps or aggregates, although still of colloidal dimensions, are quite uniform in size.

Surprising as it may seem, latex which has been treated in this manner is quite resistant to coagulation and will resist the addition of an agglomerating substance in concentrations which, in the absence of pre-treatment, bring about an almost instantaneous solidification of the mass.

Upon the addition of the agglomerating agents, however, the colloidal suspension, resulting from the pre-treatment I have described, loses its colloidal characteristics; Brownian motion slows down and gradually stops; gradually, also, a thixotropic gel structure is built up which may be broken down, temporarily, by stirring or manipulation, but which imparts sufficient plasticity to the system to prevent the separation or precipitation of the volume loading substances which may have been added.

The thixotropic stage may persist for four or five hours, before spontaneous coagulation sets in, but, at any time its irreversible coagulation may be brought about by upsetting the equilibrium in a number of known ways. One of the most effective is to withdraw a small proportion of the water into a porous mold; another is to heat the mixture slightly above room temperature; while still a third, although not well adapted to the casting procedure, is to subject the mixture to mechanical agitation or shearing forces.

I find it convenient to choose as a loading substance a material which not only possesses the physical characteristics I desire, but which will, because of its chemical nature, bring about the initial change in the latex. Such materials are Keene cement, flooring plaster, and a variety of gypsum known to the European trade as "Estrich Gips", or, its equivalent in the American market "dead burned gypsum". These materials are so essentially insoluble that, even in volume loading ratios on the rubber of 170% they release such a small supply of ions that the critical limit at which coagulation occurs is not reached.

It is not necessary, however, that the volume loading substances be confined to materials of this nature. Essentially inert materials, such as whiting, aluminum oxide, kaolin, freshly precipitated hydrous aluminum silicate, and diatomaceous earth may be added to give the volume loading desired provided that prior to the addition of the agglomerating agent some substance be added to the latex in sufficient amount to supply enough ions to bring about the essential change.

In general, I prefer to practice my invention using a rather high proportion of volume loaders, and then casting the mixture in porous molds, since this not only is the cheapest mixture, but the quickest procedure, for practically dry, firm articles come from the molds. But, even with low volume loading, and when cast in non-permeable molds, a strong, easily handled gel is formed which gives up its water satisfactorily in a drying chamber.

My invention may be illustrated by the following examples:

EXAMPLE 1

*Soft rubber, high volume loading*

Mixture A:

| | Parts by weight |
|---|---|
| Concentrated rubber dispersion 75% total solids (Revertex) | 133 |
| Zinc oxide | 10 |
| Piperidine pentamethylene dithiocarbamate | 1 |
| Whiting | 75 |
| Anhydrous gypsum ($CaSO_4$) | 64 |
| Sulphur | 2 |
| Water to make 65% total solids | |

Mixture B:

Calcium formate 6.5% solution by volume on A _____ 10%

EXAMPLE 2

*Ebonite*

Mixture C:

| | Parts by weight |
|---|---|
| Concentrated rubber dispersion 75% solids (Revertex) | 133 |
| Zinc oxide | 10 |
| Piperidine pentamethylene dithiocarbamate | 1 |
| Whiting | 95 |
| Anhydrous gypsum ($CaSO_4$) | 64 |
| Sulphur | 40 |
| Water to make 65% total solids | |

Mixture D:

Calcium formate 6.5% solution by volume on C _____ 10%

EXAMPLE 3

*Soft rubber*

Mixture E:

| | Parts by weight |
|---|---|
| Concentrated rubber dispersion 75% total solids (Revertex) | 133 |
| Zinc oxide | 10 |
| Sulphur | 2 |
| Piperidine pentamethylene dithiocarbamate | 1 |
| Whiting | 172 |
| Anhydrous gypsum ($CaSO_4$) | 25 |
| Water to make 65% total solids. | |

Mixture F:

| | Per cent |
|---|---|
| Aluminum sulphate ($Al_2(SO_4)_3.18H_2O$) 2% solution, by volume on E | 10 |
| or | |
| Ammonium nitrate, 10% solution, by volume on E | 10 |
| or | |
| Sodium carbonate, 6.5% solution, by volume on E | 10 |

Example 4

Soft rubber light loading

Mixture G:

| | Parts by weight |
|---|---|
| Concentrated rubber dispersion—solids only | 100 |
| Zinc oxide | 2 |
| Sulphur | 2 |
| Piperidine pentamethylene dithiocarbamate | 1 |
| Aluminum sulphate, 2% solution | 20 |
| Water to make 65% total solids. | |

Mixture H:

| | |
|---|---|
| Ammonium nitrate, 10% solution, by volume on G | 10% |

In preparing the above mixtures, it is desirable to grind the vulcanizing agents and inert fillers—preferably with a small amount of the formaldehyde condensation product of naphthalene sulphonic acid as a dispersing agent—with only enough water to form a paste which may easily be mixed into the "Revertex". Then the gypsum is stirred into the mixture. When using soluble substances, (as in Example 4) I find it satisfactory if these are dissolved in the water which is added to the grinding mill.

These examples are explanatory and I intend no limitation or restriction beyond that expressed in the appended claims. My invention is useful with natural or artificial latices or dispersions derived from *Hevea brasiliensis*, other forms of natural rubber, or artificial rubbers such as chlorprene or butadine polymers and whenever I have used the terms "water dispersion of rubber" or "latex", it is my intention that these terms shall include such substances.

I claim:

1. The process of casting rubber articles comprising forming a mixture of a water dispersion of rubber and dead burned gypsum in amount to produce a pourable mixture, thereafter further agglomerating the rubber dispersion by adding an agglomerating agent in amount such as will not immediately substantially reduce the pourability of the mixture, molding the mixture and vulcanizing.

2. A rubber composition comprising an aqueous rubber dispersion, a vulcanizing agent, dead burned gypsum in amount to form a pourable mixture, and an agent capable of further agglomerating the rubber dispersion and present in amount such as will not immediately substantially reduce the pourability of the mixture.

3. The process of making formed shapes from aqueous dispersions of rubber which comprises adding to the dispersion a substantial quantity of gypsum, non-active in the sense that, although capable of supplying multi-valent cations, coagulation of the latex is not brought about, thereafter adding an agglomerating agent to the mixture, placing the mixture in contact with a shape imparting surface, and then destabilizing the mixture, whereby the dispersion is coagulated and a formed shape is produced.

4. The process of making formed shapes from an aqueous dispersion of rubber which comprises adding to the dispersion a substantial quantity of gypsum, non-active in the sense that, although capable of supplying multi-valent cations to the dispersion, coagulation of the latex is not brought about, thereafter adding an agglomerating agent to the mixture, dipping a forming element into the mixture and withdrawing the element when a sufficient coat of solidified material has been built up thereon.

5. The process of making formed shapes from aqueous dispersions of rubber which comprises inducing a preliminary stage of agglomeration of the particles in the dispersion by the addition of a substance capable of furnishing a supply of multivalent cations in such an amount, however, that coagulation of the dispersion is not brought about, thereafter adding an agglomerating substance in such an amount that a still pourable mixture results, forming the mixture to the shape desired, and destabilizing the mixture while so shaped thereby causing the mixture to solidify and to retain the shape imparted to it.

6. The process of forming rubber articles containing high volume loading from aqueous dispersions of rubber which comprises inducing a preliminary stage of agglomeration of the particles in the dispersion by the addition of a volume loading substance capable of furnishing a supply of multivalent cations in such an amount, however, that coagulation of the dispersion is not brought about, thereafter adding an agglomerating substance to the mixture, placing the mixture in contact with a shape imparting surface, and then destabilizing the mixture, whereby the dispersion is coagulated and a formed shape having the volume loading substance uniformly distributed therethrough is produced.

7. The process of manufacturing formed shapes containing a high volume loading from aqueous dispersions of rubber which comprises inducing a preliminary stage of agglomeration of the particles in the dispersion by the addition of a volume loading substance capable of furnishing a supply of multivalent cations in such an amount, however, that coagulation of the dispersion is not brought about, thereafter adding an agglomerating agent capable of inducing a thixotropic state of the dispersion, casting the mixture while thixotropia is taking place, whereby the volume loading is prevented from settling, destabilizing the mixture, and thereby producing solidified formed shapes.

ERNST ALFRED HAUSER.